UNITED STATES PATENT OFFICE.

EDWARD WESTERMAYR, OF ST. LOUIS, MISSOURI.

IMPROVEMENT IN THE MANUFACTURE OF ARTIFICIAL STONE.

Specification forming part of Letters Patent No. 132,550, dated October 29, 1872.

To all whom it may concern:

Be it known that I, EDWARD WESTERMAYR, of St. Louis city and county, and State of Missouri, have invented a new and useful Improvement for the Manufacture of Artificial Stone, &c; and I do hereby declare the following to be a full, clear, and exact description thereof, which will enable others skilled in the art to which my invention appertains to make and use the same.

My invention consists in producing artificial stone, tiles, bricks, moldings, paving material, &c., of any desired form or color, by mixing and compounding certain materials, and subjecting the mixture to certain novel processes, hereinafter explained.

In Letters Patent heretofore granted me by the United States Patent Office, bearing date October 12, 1869, for artificial stone, &c., I take one (1) part of Portland or other good cement, one-half (½) part of clean sand, and one-half (½) part of slag, (cinder of iron,) and mix together in a dry state; and for bridge-piers I take one (1) part cement, one (1) part sand, one (1) part slag, and six (6) parts of fine or coarse gravel, and to these mixtures, separately, I add water alone, or water containing sulphate of iron or copperas in solution, in sufficient quantity to make a stiff mortar by stirring up the mass thoroughly. At this time, and before molded, any desired color can be given the material by mixing any suitable pigments with the mortar, such as India red, lamp-black, and other coloring material. This preparation I used for all the various articles heretofore mentioned, making only a distinction on stone for bridge-piers. When the mortar has been made I put it into molds of any desired form, and subject it to pressure by any suitable means, until compacted into a mass sufficiently firm, fixed, and solid to form artificial stone, tile, bricks, moldings, bridge-piers, &c. The article so formed I then place in a drying-room, and keep it there about two weeks, more or less, when I put it into a reservoir of clean water and allow it to remain about twenty-four hours, for the purpose of dissolving any particles of lime that may be adhering to or remaining in it, as well as for increasing its hardness. After being removed from the water and allowed to dry, it will be found in the course of four or five weeks to possess all the hardness and durability of natural stone, and superior to it in many respects. This is by the old process.

By my improvement I first clean the sand, and first take about fifty (50) cubic feet of sand and put it in a large vat or box for that purpose. I then take ten (10) barrels of water, in which I dissolve one hundred (100) pounds of potash. I then pour this water over the sand and let it remain forty-eight (48) hours. At the end of that time I drain off this water, and wash the sand with clean water. In this way all fragments of coal and other impurities are dissolved and cleansed from the sand. To make building-stone, I take two (2) parts cement, one (1) part gravel, two (2) parts sand, and three (3) parts iron-slag, (cinder of iron,) and one (1) part soap-stone. This I thoroughly mix in a dry state. Afterward I take one-half (½) pound of borax for every ten (10) gallons of water, and mix all the ingredients to a stiff mortar. To give building-stone the color of marble, I impregnate the mortar with the following: Ten (10) gallons water, one (1) pound cement, one-half (½) pound lime, one-half (½) pound water-glass. This is thoroughly stirred and mixed with the mortar. The above preparation of ingredients I use for making building-stone and paving material. I then put the mortar into molds of any desired form for paving-stone or building-stone, and subject it therein to a pressure, by any suitable means, until compacted into a mass sufficiently firm, fixed, and solid to form artificial stone, brick, moldings, bridge-piers, paving material, &c. When the stone or other material heretofore mentioned is taken from the press, I place it in a drying-room for about five (5) days. I then place it in a bath for about three hours, the bath being composed of ten (10) parts water and one (1) part water-glass. When taken from this bath, at the end of three hours, and allowed to dry for about twelve days, it will be found to possess all the hardness and durability of the best qualities of natural stone, and superior to it in many respects. I then apply to the stone or other material, if desired, a coat of linseed-oil to prevent the action of water and frost upon it. For making tiles, generally I take two (2) parts of sand, three (3) parts of cement, and one-half (½) of soap-stone, mixing these ingredients thoroughly in a dry state. I then reduce this preparation to a thick mortar by adding one-half (½) pound of borax to every ten gallons of water used, (dissolving the borax in the water first,) when it is ready for molding. Any desired color can be given to the tiling or other material by mixing any suitable pigments with the mortar, as India red, lamp-black, and other coloring material.

I do not intend to confine myself to any specific proportion of the ingredients, as they may be varied indefinitely in the manufacture of various articles without departing from my improvement or invention.

The building-stone and paving material are susceptible of a beautiful polish, which can be produced by finishing them with sand-paper. In this way I am able to produce or manufacture stone or other material to be employed in the different structures and for the different uses mentioned of any desired form or color. By cleaning the sand I not only add to the beauty of the stone or other material, but prepare it for the reception of the other ingredients, which have a more powerful effect, and produce a firmer and more durable article. By the additional ingredients I am able to manufacture a firmer stone, and at the same time produce a glassy and beautiful polish, if desired; also, to produce a paving-stone or material of any desired color, shape, or cast. By the additional ingredients and the cleansing-process, I am able to shorten the process of drying, and save time in the manufacture of the articles and materials.

Having thus described my invention, what I claim as new, and desire to secure by Letters Patent, is—

1. Cleaning sand to be used in the manufacture of artificial stone, &c., by subjecting it to a bath of potash-water, as hereinbefore set forth.

2. The manufacture of artificial stone, tile, &c., from a composition of matter consisting of cement, gravel, sand, iron-slag, and soapstone, reduced to the consistency of mortar by adding water in which borax has been dissolved, the several ingredients being used in the proportions and in the manner described, and the composition shaped in molds, subjected to a drying-process, and to a bath, as hereinbefore set forth.

EDW. WESTERMAYR.

Witnesses:
 WM. J. REED,
 WM. F. SMITH.